(12) United States Patent
Yu

(10) Patent No.: US 11,314,124 B2
(45) Date of Patent: Apr. 26, 2022

(54) DISPLAY DEVICE

(71) Applicant: WUHAN CHINA STAR OPTOELECTRONICS TECHNOLOGY CO., LTD., Wuhan (CN)

(72) Inventor: Pengfei Yu, Wuhan (CN)

(*) Notice: Subject to any disclaimer, the term of this patent is extended or adjusted under 35 U.S.C. 154(b) by 223 days.

(21) Appl. No.: 16/632,356

(22) PCT Filed: Nov. 5, 2019

(86) PCT No.: PCT/CN2019/115701
§ 371 (c)(1),
(2) Date: Jan. 19, 2020

(87) PCT Pub. No.: WO2021/056691
PCT Pub. Date: Apr. 1, 2021

(65) Prior Publication Data
US 2021/0405446 A1 Dec. 30, 2021

(30) Foreign Application Priority Data
Sep. 24, 2019 (CN) .......................... 201910902580.6

(51) Int. Cl.
*G02F 1/13357* (2006.01)
*G02F 1/1333* (2006.01)
*G02F 1/1335* (2006.01)
*H04N 5/225* (2006.01)

(52) U.S. Cl.
CPC .... *G02F 1/133602* (2013.01); *G02F 1/13338* (2013.01); *G02F 1/133331* (2021.01); *G02F 1/133512* (2013.01); *G02F 1/133528* (2013.01); *H04N 5/2257* (2013.01)

(58) Field of Classification Search
CPC ......... G02F 1/133331; G02F 1/133528; G02F 1/13338; G02F 1/133602; G02F 1/133512; G02B 5/3025; H04N 5/2257; H04M 1/0264
See application file for complete search history.

(56) References Cited

U.S. PATENT DOCUMENTS

| | | | |
|---|---|---|---|
| 10,534,221 B1* | 1/2020 | Zhu | G02F 1/133602 |
| 2012/0206669 A1 | 8/2012 | Kim et al. | |
| 2013/0335610 A1 | 12/2013 | Yamada | |

(Continued)

FOREIGN PATENT DOCUMENTS

| CN | 103491284 A | 1/2014 |
|---|---|---|
| CN | 107784989 A | 3/2018 |

(Continued)

*Primary Examiner* — Jia X Pan

(57) ABSTRACT

The present invention provides a display device. Multiple functional layers on a display panel are provided with a functional region arranged corresponding to a camera module. The functional region includes a light transmissive region arranged corresponding to a first hole and a light shielding region arranged around the light transmissive region. The light shielding region is arranged corresponding to the light shielding member in a backlight module, and the light shielding region shields a light shielding member. Such configuration improves a problem that an aperture of an opening region of an under-screen camera deforms due to the light shielding member.

18 Claims, 2 Drawing Sheets

(56) References Cited

U.S. PATENT DOCUMENTS

| | | | |
|---|---|---|---|
| 2015/0241732 A1 | 8/2015 | Kim et al. | |
| 2016/0011633 A1* | 1/2016 | Watanabe | G09G 3/3648 |
| | | | 345/184 |
| 2021/0335835 A1* | 10/2021 | Yang | H04N 5/2257 |
| 2021/0408499 A1* | 12/2021 | Li | H04N 5/2257 |

FOREIGN PATENT DOCUMENTS

| | | | | | |
|---|---|---|---|---|---|
| CN | 108681131 | A | | 10/2018 | |
| CN | 108983469 | A | | 12/2018 | |
| CN | 109116628 | A | * | 1/2019 | |
| CN | 109272868 | A | * | 1/2019 | ........... G06F 1/1686 |
| CN | 109445171 | A | * | 3/2019 | |
| CN | 208922027 | U | | 5/2019 | |
| DE | 102011089443 | A1 | | 8/2012 | |

* cited by examiner

DISPLAY DEVICE

FIELD AND BACKGROUND OF THE INVENTION

The present invention relates to a field of display devices and in particular, to a display device.

With development of liquid crystal display technology, especially for full-screen designs, most manufacturers install in a display device a backlight module with an opening facing inward, so that an under-screen camera can be placed in the opening to receive ambient light.

In conventional display devices, when the under-screen camera is disposed under the opening of the backlight module of the display device, the opening will only serve as a channel for the under-screen camera to receive ambient light. In order to prevent the backlight module's backlight source from interfering with the opening, the light shielding adhesive is often applied at a gap between a lower polarizer and a display panel and at a boundary between an opening region and the backlight source. However, due to a lack of coating precision of the light shielding adhesive and the interference with adhesive layers at edges of the opening of a backlight plate, the light shielding adhesive may overflow or be insufficiently applied, which causes a shape of the opening to deform or leads to a dent in a periphery of the opening, and thus affects product quality.

Therefore, there is a need for a display device which can solve the above technical problems.

SUMMARY OF THE INVENTION

The present invention provides a display device to solve a problem of aperture deformation of an opening region in which an under-screen camera is disposed in a conventional display device.

Accordingly, the present invention provides solutions as follows.

The present invention provides a display device, comprising:
  a display module;
  a backlight module disposed on one side of the display module; and
  a camera module disposed on one side of the backlight module away from the display module, wherein the display module comprises:
    a display panel provided with a first hole; and
    a plurality of functional layers disposed on the display panel, wherein at least one of the functional layers comprises a functional region disposed corresponding to the camera module, and the functional region comprises a light transmissive region arranged corresponding to the first hole and a light shielding region around the light transmissive region;
  wherein the backlight module comprises a backlight unit, the backlight unit is provided with a backlight hole, and the camera module and the first hole are arranged corresponding to the backlight hole; and
  wherein when the camera module is in operation, external light passes through the light transmissive region of the functional layers and the first hole of the display panel and enters the camera module.

In the display device of the present invention, the functional layers comprise a polarizer layer and a cover layer, and at least one of the polarizer layer and the cover layer comprises the functional region arranged corresponding to the camera module.

In the display device of the present invention, the cover layer comprises a first functional region corresponding to the camera module;
  the first functional region comprises a first light transmissive region corresponding to the first hole and a first light shielding region around the first light transmissive region;
  the polarizer layer comprises a second hole disposed corresponding to the first light transmissive region; and
  when the camera module is in operation, external light passes through the first light transmissive region in the cover layer, the second hole in the polarizer layer, and the first hole of the display panel and enters the camera module.

In the display device of the present invention, an orthographic projection of the second hole projected onto the cover layer coincides with the first light transmissive region, and an orthographic projection of the first hole projected onto the cover layer is in the first light transmissive region.

In the display device of the present invention, the polarizer layer further comprises a second light shielding region disposed corresponding to the first light shielding region; and the second light shielding region is disposed around the second hole, and an orthographic projection of the second light shielding region projected onto the cover layer is in the first light shielding region.

In the display device of the present invention, the functional layers further comprise a touch layer disposed between the cover layer and the display panel; and the touch layer comprises a third hole and a third shielding region, the third hole is disposed corresponding to the first hole, and the third light shielding region is arranged around the third hole and disposed corresponding to the first light shielding region.

In the display device of the present invention, the first hole is a blind hole, and the second hole and the third hole are through holes.

In the display device of the present invention, the first light shielding region, the second light shielding region, or the third light shielding region comprises one of ink, a black photoresist material, and a light-shielding metal.

In the display device of the present invention, the camera module comprises a shutter plate, and a surface of the shutter plate adjacent to the display panel is made of a reflective material.

In the display device of the present invention, the backlight module further comprises a light shielding member disposed between the backlight unit and the backlight hole, and the light shielding member is disposed corresponding to the light shielding region.

The present invention provides a display device, comprising:
  a display module;
  a backlight module disposed on one side of the display module; and
  a camera module disposed on one side of the backlight module away from the display module, wherein the display module comprises:
    a display panel provided with a first hole; and
    a plurality of functional layers disposed on the display panel, wherein at least one of the functional layers comprises a functional region disposed corresponding to the camera module, and the functional region comprises a light transmissive region disposed corresponding to the first hole and a light shielding region arranged around the light transmissive region; and
  wherein when the camera module is in operation, external light passes through the light transmissive region of the functional layers and the first hole of the display panel and enters the camera module.

In the display device of the present invention, the functional layers comprise a polarizer layer and a cover layer, and at least one of the polarizer layer and a cover layer comprises the functional region arranged corresponding to the camera module.

In the display device of the present invention, the cover layer comprises a first functional region disposed corresponding to the camera module;

the first functional region comprises a first light transmissive region arranged corresponding to the first hole and a first light shielding region arranged around the first light transmissive region;

the polarizer layer comprises a second hole disposed corresponding to the first light transmissive region; and when the camera module is in operation, external light passes through the first light transmissive region in the cover layer, the second hole in the polarizer layer, and the first hole of the display panel and enters the camera module.

In the display device of the present invention, an orthographic projection of the second hole projected onto the cover layer coincides with the first light transmissive region, and an orthographic projection of the first hole projected onto the cover layer is in the first light transmissive region.

In the display device of the present invention, the polarizer layer further comprises a second light shielding region disposed corresponding to the first light shielding region; and the second light shielding region is disposed around the second hole, and an orthographic projection of the second light shielding region projected onto the cover layer is in the first light shielding region.

In the display device of the present invention, the functional layers further comprise a touch layer disposed between the cover layer and the display panel; and the touch layer comprises a third hole and a third light shielding region, the third hole is disposed corresponding to the first hole, and the third light shielding region is arranged around the third hole and disposed corresponding to the first light shielding region.

In the display device of the present invention, the first hole is a blind hole, and the second hole and the third hole are through holes.

In the display device of the present invention, the first light shielding region, the second light shielding region, or the third light shielding region comprises one of ink, a black photoresist material, and a light-shielding metal.

In the display device of the present invention, the camera module comprises a shutter plate, and a surface of the shutter plate adjacent to the display panel is made of a reflective material.

In the display device of the present invention, the backlight module comprises a backlight unit, the backlight unit is provided with a backlight hole, and the camera module and the first hole are arranged corresponding to the backlight hole; and the backlight module further comprises a light shielding member disposed between the backlight unit and the backlight hole, and the light shielding member is disposed corresponding to the light shielding region.

Advantages of the Present Invention

The functional layers on the display panel are provided with the functional region arranged corresponding to the camera module. The functional region includes the light transmissive region arranged corresponding to the first hole and the light shielding region arranged around the light transmissive region. The light shielding region is arranged corresponding to the light shielding member in the backlight module, and the light shielding region shields the light shielding member. Such configuration improves a problem that an aperture of an opening region of an under-screen camera deforms due to the light shielding member.

BRIEF DESCRIPTION OF THE SEVERAL VIEWS OF THE DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without an inventive work.

DETAILED DESCRIPTION OF EMBODIMENTS

Figure 1:
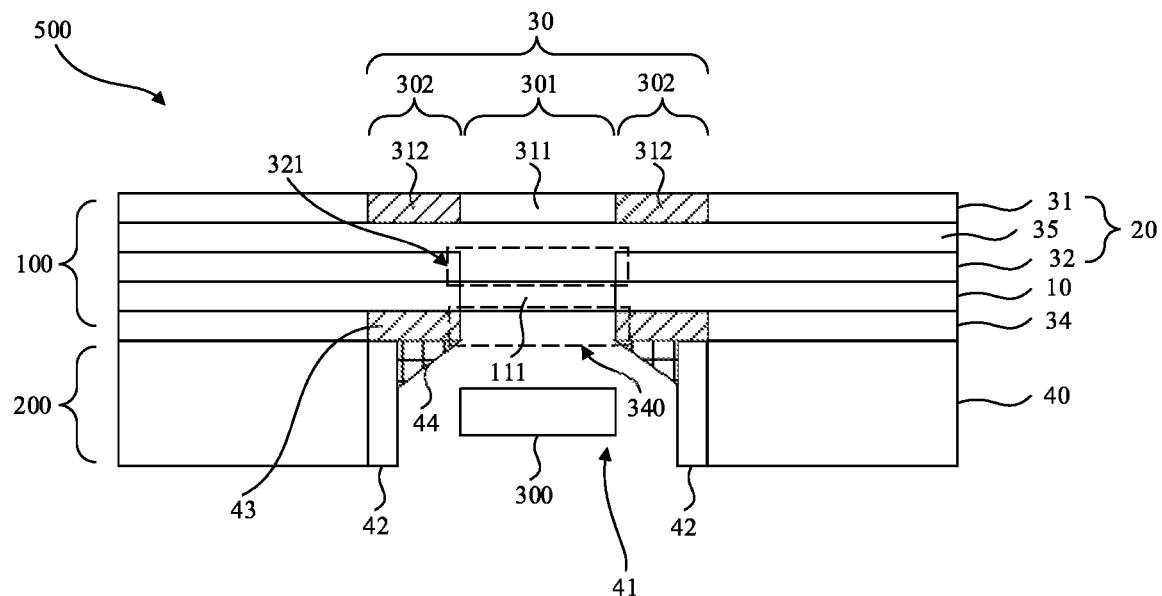
FIG. 1 is a first structural view illustrating a display device according to the present invention.

The following description is provided to illustrate specific embodiments of the present invention. Directional terms mentioned in the present invention, such as "upper", "lower", "front", "rear", "left", "right", "inside", "outside", and "lateral", are only for illustrative purposes. The directional terms are for the purpose of illustration and ease of understanding, and are not intended to be limiting. In the drawings, structurally similar elements are denoted by the same reference numerals.

In conventional techniques, in order to prevent a backlight module's backlight source from interfering with an opening, a light shielding adhesive is often applied at a gap between a lower polarizer and a display panel and at a boundary between an opening region and the backlight module. However, due to a lack of coating precision of the light shielding adhesive and the interference with adhesive layers at an edge of the opening of a backlight plate, the light shielding adhesive may overflow or be insufficiently applied, thus leading to a deformed shape of the opening or a dent at a periphery of the opening, and affecting product quality. The present invention provides a display device to solve the above problems.

Figure 2:
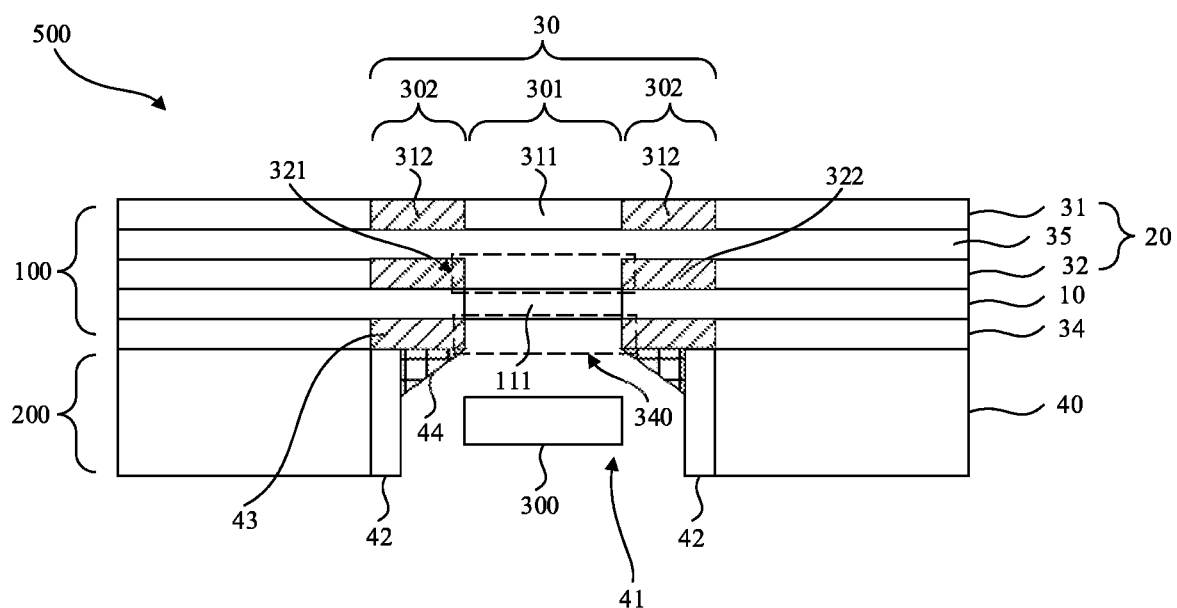
FIG. 2 is a second structural view illustrating the display device according to the present invention.
Figure 3:
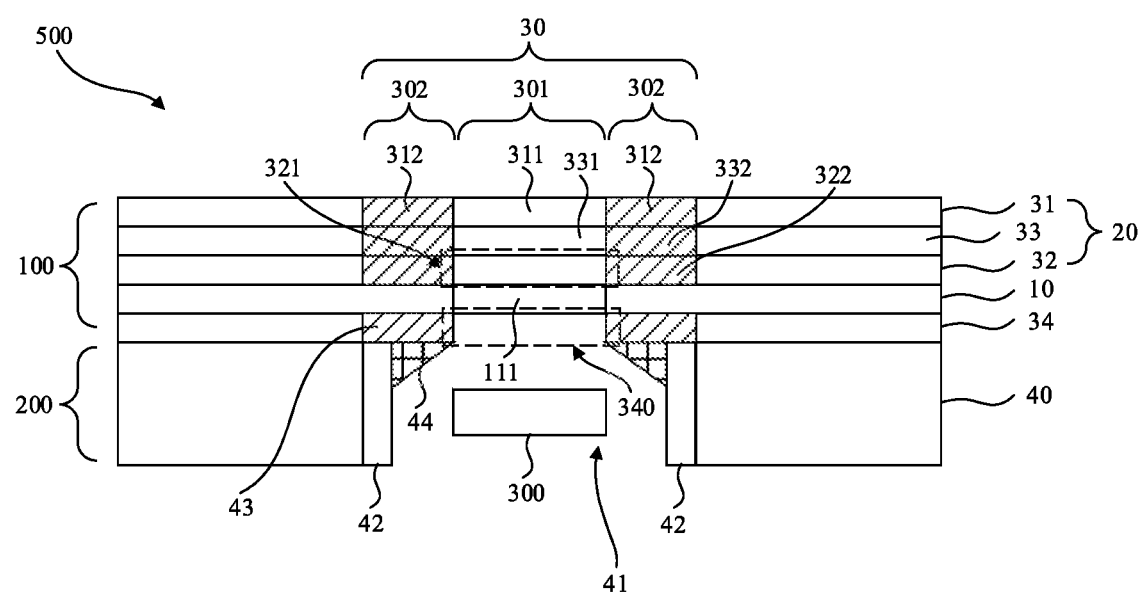
FIG. 3 is a third structural view illustrating the display device according to the present invention.

Referring to FIGS. 1 to 3, the present invention provides a display device 500, comprising:

a display module 100;

a backlight module 200 disposed on one side of the display module 100; and a camera module 300 disposed on one side of the backlight module 200 away from the display module 100, wherein the display module 100 comprises:

a display panel 10 provided with a first hole 111; and a plurality of functional layers 20 disposed on the display panel 10, wherein at least one of the functional layers 20 comprises a functional region 30 disposed corresponding to the camera module 300, and the functional region 30 comprises a light transmissive region 301 arranged corresponding to the first hole 111 and a light shielding region 302 around the light transmissive region 301; and wherein when the camera module 300 is in operation, external light passes through the light transmissive region 301 of the functional layers 20 and the first hole 111 of the display panel 10 and enters the camera module 300.

In the present invention, the functional layers 20 on the display panel 10 comprise the functional region 30 arranged corresponding to the camera module 300. The functional region 30 comprises a light transmissive region 301 arranged corresponding to the first hole 111 and also comprises a light shielding region 302 around the light transmissive region 301. The light shielding region 302 is disposed corresponding to a light shielding member 42 in the backlight module 200. The light shielding region 302 shields the light shielding member 42, thereby improving a problem that the light shielding member 42 causes deformation of an aperture of an opening region of an under-screen camera.

Referring to FIGS. 1 to 3, the functional layers 20 comprise a polarizer layer and a cover layer 31, and at least one of the polarizer layer and the cover layer 31 comprises the functional region 30 arranged corresponding to the camera module 300.

The technical solutions of the present application are described below in conjunction with specific embodiments.

First Embodiment

Referring to FIG. 1, the display module 100 includes an upper polarizer layer 32 on the display panel 10 and a cover layer 31 on the upper polarizer layer 32.

In the present embodiment, the cover layer 31 comprises a first functional region disposed corresponding to the camera module 300. The first functional region 30 comprises a first light transmissive region 311 arranged corresponding to the first hole 111 and a first light shielding region 312 arranged around the first light transmissive region 311.

According to the present embodiment, the first light shielding region 312 is made of one of ink, a black photoresist material, and a light-shielding metal.

According to the present embodiment, the first light shielding region 312 has a ring shape.

According to the present embodiment, the polarizer layer 32 comprises a second hole 321 disposed corresponding to the first light transmissive region 311. The first hole 111 is a blind hole, and the second hole 321 is a through hole.

According to the present embodiment, the upper polarizer layer 32 is connected to the cover layer 31 through an optical adhesive 35. The optical adhesive 35 in the present embodiment fills the second hole 321 because the first hole 111 is a blind hole and the second hole 321 is a through hole.

In the present embodiment, an orthographic projection of the first hole 111 projected onto the cover layer 31 is in the first light transmissive region 311. An orthographic projection of the second hole 321 projected onto the cover layer 31 coincides with the first light transmissive region 311. Sizes of the first hole 111 and the second hole 321 are not specifically limited in the present invention, and both of them may be holes having the same shape and size.

Referring to FIG. 1, the backlight module 200 comprises a backlight unit 40.

In the present embodiment, the backlight unit 40 is provided with a backlight hole 41, and the camera module 300 and the first hole 111 are arranged corresponding to the backlight hole 41. A camera or/and a photosensitive element of the camera module 300 can be disposed in the backlight hole 41.

In the present embodiment, the backlight unit 40 may include a reflective sheet on a back plate, a light guide plate on the reflective sheet, a diffusion sheet on the light guide plate, a lower brightness enhancement sheet on the diffusion sheet, and an upper brightness enhancement sheet on the lower brightness enhancement sheet.

In the present embodiment, the backlight hole 41 penetrates, from bottom to top, the back plate, the reflective sheet, the light guide plate, the diffusion sheet, the lower brightness enhancement sheet, and the upper brightness enhancement sheet. The diffusion sheet diffuses light to provide a uniform surface light source. The lower brightness enhancement sheet and the upper brightness enhancement sheet enhance the brightness of a light source. An illumination effect of the backlight unit 40 directly affects a visual effect of the backlight module 200.

In the present embodiment, the backlight module 200 further comprises a light shielding member 42 disposed between the backlight unit 40 and the backlight hole 41.

In the present embodiment, the light shielding member 42 is disposed corresponding to the light shielding region 302. The light shielding member 42 is configured to prevent light of the backlight module 200 from entering the backlight hole 41 and an area of the display module 100 corresponding to the backlight hole 41.

The present embodiment further comprises a lower polarizer layer 34 disposed between the backlight module 200 and the display panel 10. A fourth hole 340 is defined in the lower polarizer layer 34. The fourth hole 340 is disposed corresponding to the functional region 30 of the functional layers 20. The fourth hole 340 and the functional region 30 can have a same area.

In the present embodiment, the light shielding member 42 is disposed corresponding to the fourth hole 340. A first light shielding adhesive 43 is disposed between the light shielding member 42 and the fourth hole 340. A second light shielding adhesive 44 is disposed on one side of the light shielding member 42 adjacent to the backlight hole 41. The first light shielding adhesive 43 and the second light shielding adhesive 44 are used to prevent the light of the backlight module 200 from entering the backlight hole 41 and an area of the display module 100 corresponding to the backlight hole 41.

When the camera module 300 is in operation, the backlight module 200 does not emit backlight, and ambient light passes through the first light transmissive region 311 in the cover layer 31, the second hole 321 in the polarizer layer, and the first hole 111 of the display panel 10 and enters the camera module 300. When the camera module 300 is not in operation, the backlight module 200 emits backlight. Due to the presence of the light shielding member 42, the first light shielding adhesive 43, and the second light shielding adhesive 44, the backlight is emitted from an area excluding the functional region 30 of the display module 100. In addition to that, the first light shielding region 312 shields the light shielding member 42, the first light shielding adhesive 43, and the second light shielding adhesive 44, thus solving a problem that the aperture of the opening region of the under-screen camera deforms due to the light shielding member 42.

Second Embodiment

Referring to FIG. 2, the present embodiment is the same as or similar to the first embodiment, except for a difference that:

The upper polarizer layer 32 further includes a second light shielding region 322 arranged corresponding to the first light shielding region 312.

In the present embodiment, the second light shielding region 322 is disposed around the second hole 321, and an orthographic projection of the second light shielding region 322 projected onto the cover layer 31 is in the first light shielding region 312.

In the present embodiment, the second light shielding region 322 and the first light shielding region 312 can be made of the same material. The second light shielding region 322 and the first light shielding region 312 can have a same shape and a same size.

In the present embodiment, the upper polarizer layer 32 is provided with the second hole 321 disposed corresponding to the first light transmissive region 311 and the second light shielding region 322 arranged corresponding to the first light shielding region 312. When the camera module 300 is not in operation, the first light shielding region 312 and the second light shielding region 322 together shield the light shielding member 42, the first light shielding adhesive 43, and the second light shielding adhesive 44, thus solving a problem that the aperture of the opening region of the under-screen camera deforms due to the light shielding member 42.

In one embodiment, the functional layers 20 may solve the above technical problem by simply including the second light shielding region 322 in the upper polarizer layer 32.

Third Embodiment

Referring to FIG. 3, the third embodiment is the same as or similar to the first embodiment and the second embodiment, except for a difference that: the functional layers 20 further comprise a touch layer 33 disposed between the cover layer 31 and the display panel 10. The touch layer 33 may be disposed between the upper polarizer layer 32 and the cover layer 31, or between the display panel 10 and the upper polarizer layer 32, or embedded in the cover layer 31. The position of the touch layer 33 is not limited in this embodiment.

In the present embodiment, the touch layer 33 comprises a third hole 331 and a third light shielding region 332. The third hole 331 is disposed corresponding to the first hole 111, and the third light shielding region 332 is arranged around the third hole 331 and disposed corresponding to the first light shielding region 312.

In the present embodiment, the third hole 331 can be a through hole.

In the present embodiment, the third light shielding region 332 can be made of a material the same as the material of the first light shielding region 312 and the second light shielding region 322. A shape and a size of the third light shielding region 332 can be the same as the shape and the size of the first light shielding region 312 and the third light shielding region 332.

In the present embodiment, a light-shielding metal layer can be formed in the third light shielding region 332 of the touch layer 33 in a film formation process to achieve a light shielding effect.

In the present embodiment, the touch layer 33 is disposed on the display panel 10. The touch layer 33 comprises the third hole 331 disposed corresponding to the first light transmissive region 311 and also comprises the third light shielding region 332 disposed corresponding to the first light shielding region 312. Therefore, when the camera module 300 is not in operation, the first light shielding region 312, the second light shielding region 322, and the third light shielding region 332 together shield the light shielding member 42, the first light shielding adhesive 43, and the second light shielding adhesive 44, thus improving the problem that the aperture of the opening region of the under-screen camera deforms due to the light shielding member 42.

In one embodiment, to solve the above technical problem, the functional layers 20 can imply include the third light shielding region 332 in the touch layer 33. Alternatively, the functional layers 20 can simply include the third light shielding region 332 in the touch layer 33 and the second light shielding region 322 in the upper polarizer layer 32 to solve the above technical problem. Otherwise, the functional layers 20 can simply include the third light shielding region 332 in the touch layer 33 and the first light shielding region 312 in the cover layer 31 to solve the above technical problem.

In one embodiment, the present invention can have a light shielding region 302 arranged in the display panel 10 corresponding to the first light shielding region 312. In the film formation process of the display panel 10, a light-shielding material is deposited in a region of the display panel 10 corresponding to the first light shielding region 312.

In the present embodiment, the camera module 300 comprises a shutter plate (not illustrated), and a surface of the shutter plate adjacent to the display panel 10 is made of a reflective material.

In the present embodiment, when the camera module 300 is in operation, the shutter plate of the camera module 300 is opened, and the ambient light passes through the first transmissive region and related openings or through holes corresponding to the first transmissive region to enter the camera module 300. When the camera module 300 is not in operation, the shutter plate of the camera module 300 is closed, and the shutter plate reflects light when the ambient light enters the display module 100, thereby preventing the camera module 300 from being damaged by the ambient light.

The display device in the present embodiment may be any product or device having a display function, such as a mobile phone, a tablet computer, a television, a display, a laptop computer, a digital photo frame, and a navigator.

The present invention provides a display device. The display device comprises a display module, a backlight module, and a camera module. The functional layers on the display panel comprise a functional region disposed corresponding to the camera module. The functional region comprises a light transmissive region disposed corresponding to the first hole and a light shielding region arranged around the light transmissive region. The light shielding region is arranged corresponding to the light shielding member in the backlight module, and the light shielding region shields the light shielding member, thereby improving the problem that the aperture of the opening region of the under-screen camera deforms due to the light shielding member.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:
1. A display device, comprising:
a display module;

a backlight module disposed on one side of the display module; and a camera module disposed on one side of the backlight module away from the display module, wherein the display module comprises:

a display panel provided with a first hole 1, wherein the camera module comprises a shutter plate, and a surface of the shutter plate adjacent to the display panel is made of a reflective material; and a plurality of functional layers disposed on the display panel, wherein at least one of the functional layers comprises a functional region disposed corresponding to the camera module, and the functional region comprises a light transmissive region arranged corresponding to the first hole and a light shielding region around the light transmissive region;

wherein the backlight module comprises a backlight unit, the backlight unit is provided with a backlight hole, and the camera module and the first hole are arranged corresponding to the backlight hole; and wherein when the camera module is in operation, external light passes through the light transmissive region of the functional layers and the first hole of the display panel and enters the camera module.

2. The display device according to claim 1, wherein the functional layers comprise a polarizer layer and a cover layer, and at least one of the polarizer layer and the cover layer comprises the functional region arranged corresponding to the camera module.

3. The display device according to claim 2, wherein the cover layer comprises a first functional region corresponding to the camera module;

the first functional region comprises a first light transmissive region corresponding to the first hole and a first light shielding region around the first light transmissive region;

the polarizer layer comprises a second hole disposed corresponding to the first light transmissive region; and when the camera module is in operation, external light passes through the first light transmissive region in the cover layer, the second hole in the polarizer layer, and the first hole of the display panel and enters the camera module.

4. The display device according to claim 3, wherein an orthographic projection of the second hole projected onto the cover layer coincides with the first light transmissive region, and an orthographic projection of the first hole projected onto the cover layer is in the first light transmissive region.

5. The display device according to claim 3, wherein the polarizer layer further comprises a second light shielding region arranged corresponding to the first light shielding region; and the second light shielding region is disposed around the second hole, and an orthographic projection of the second light shielding region projected onto the cover layer is in the first light shielding region.

6. The display device according to claim 5, wherein the functional layers further comprise a touch layer disposed between the cover layer and the display panel; and the touch layer comprises a third hole and a third shielding region, the third hole is disposed corresponding to the first hole, and the third light shielding region is arranged around the third hole and disposed corresponding to the first light shielding region.

7. The display device according to claim 6, wherein the first hole is a blind hole, and the second hole and the third hole are through holes.

8. The display device according to claim 6, wherein the first light shielding region, the second light shielding region, or the third light shielding region comprises one of ink, a black photoresist material, and a light-shielding metal.

9. The display device according to claim 1, wherein the backlight module further comprises a light shielding member disposed between the backlight unit and the backlight hole, and the light shielding member is disposed corresponding to the light shielding region.

10. A display device, comprising:

a display module;

a backlight module disposed on one side of the display module; and a camera module disposed on one side of the backlight module away from the display module, wherein the display module comprises:

a display panel provided with a first hole, wherein the camera module comprises a shutter plate, and a surface of the shutter plate adjacent to the display panel is made of a reflective material; and a plurality of functional layers disposed on the display panel, wherein at least one of the functional layers comprises a functional region disposed corresponding to the camera module, and the functional region comprises a light transmissive region disposed corresponding to the first hole and a light shielding region arranged around the light transmissive region; and wherein when the camera module is in operation, external light passes through the light transmissive region of the functional layers and the first hole of the display panel and enters the camera module.

11. The display device according to claim 10, wherein the functional layers comprise a polarizer layer and a cover layer, and at least one of the polarizer layer and a cover layer comprises the functional region arranged corresponding to the camera module.

12. The display device according to claim 11, wherein the cover layer comprises a first functional region disposed corresponding to the camera module;

the first functional region comprises a first light transmissive region arranged corresponding to the first hole and a first light shielding region arranged around the first light transmissive region;

the polarizer layer comprises a second hole disposed corresponding to the first light transmissive region; and when the camera module is in operation, external light passes through the first light transmissive region in the cover layer, the second hole in the polarizer layer, and the first hole of the display panel and enters the camera module.

13. The display device according to claim 12, wherein an orthographic projection of the second hole projected onto the cover layer coincides with the first light transmissive region, and an orthographic projection of the first hole projected onto the cover layer is in the first light transmissive region.

14. The display device according to claim 12, wherein the polarizer layer further comprises a second light shielding region arranged corresponding to the first light shielding region; and the second light shielding region is disposed around the second hole, and an orthographic projection of the second light shielding region projected onto the cover layer is in the first light shielding region.

15. The display device according to claim 14, wherein the functional layers further comprise a touch layer disposed between the cover layer and the display panel; and the touch layer comprises a third hole and a third light shielding region, the third hole is disposed corresponding to the first hole, and the third light shielding region is arranged around the third hole and disposed corresponding to the first light shielding region.

16. The display device according to claim 15, wherein the first hole is a blind hole, and the second hole and the third hole are through holes.

17. The display device according to claim 15, wherein the first light shielding region, the second light shielding region, or the third light shielding region comprises one of ink, a black photoresist material, and a light-shielding metal.

18. The display device according to claim 10, wherein the backlight module comprises a backlight unit, the backlight unit is provided with a backlight hole, and the camera module and the first hole are arranged corresponding to the backlight hole; and the backlight module further comprises a light shielding member disposed between the backlight unit and the backlight hole, and the light shielding member is disposed corresponding to the light shielding region.

\* \* \* \* \*